(12) United States Patent
Tomiyama et al.

(10) Patent No.: US 7,811,397 B2
(45) Date of Patent: Oct. 12, 2010

(54) GAS GENERATING AGENT

(75) Inventors: Shogo Tomiyama, Himeji (JP); Jianzhou Wu, Himeji (JP)

(73) Assignee: Daicel Chemical Industries, Ltd., Sakai-Shi (JP)

( * ) Notice: Subject to any disclaimer, the term of this patent is extended or adjusted under 35 U.S.C. 154(b) by 1086 days.

(21) Appl. No.: 11/213,861

(22) Filed: Aug. 30, 2005

(65) Prior Publication Data

US 2006/0065338 A1 Mar. 30, 2006

Related U.S. Application Data

(60) Provisional application No. 60/614,051, filed on Sep. 30, 2004.

(30) Foreign Application Priority Data

Sep. 27, 2004 (JP) ............... 2004-278830

(51) Int. Cl.
C06B 41/00 (2006.01)
C06B 31/00 (2006.01)
D03D 23/00 (2006.01)
D03D 43/00 (2006.01)

(52) U.S. Cl. ............ 149/23; 149/45; 149/109.2; 149/109.4

(58) Field of Classification Search ......... 149/88, 149/109.4, 23, 45, 109.2
See application file for complete search history.

(56) References Cited

U.S. PATENT DOCUMENTS

| | | | |
|---|---|---|---|
| 5,525,170 A | 6/1996 | Stark et al. | |
| 5,641,938 A | 6/1997 | Holland et al. | |
| 6,132,537 A * | 10/2000 | Zeuner et al. | ............ 149/45 |
| 6,505,562 B1 | 1/2003 | Wu | |
| 6,561,301 B1 * | 5/2003 | Hattori et al. | ............ 180/274 |
| 6,857,495 B2 | 2/2005 | Sawa | |
| 2003/0051630 A1 * | 3/2003 | Katsuda et al. | ............ 102/531 |
| 2003/0057398 A1 | 3/2003 | Harada | |
| 2005/0263224 A1 | 12/2005 | Wu et al. | |

FOREIGN PATENT DOCUMENTS

| | | |
|---|---|---|
| EA | 0 913 375 A1 | 5/1999 |
| EP | 1 342 705 A1 | 9/2003 |
| EP | 1 369 317 B1 | 1/2006 |
| EP | 1 350 691 B1 | 10/2006 |
| FR | 2 703 990 A1 | 10/1994 |
| FR | 2 772 750 A1 | 6/1999 |
| JP | 8-40793 | 2/1996 |
| JP | 8-216826 | 8/1996 |
| JP | 10-265290 | 10/1998 |
| JP | 11-139892 | 5/1999 |
| JP | 11-278977 | 10/1999 |
| JP | 2001-278689 | 10/2001 |
| JP | 2003-95044 | 4/2003 |
| JP | 2003-321293 | 11/2003 |
| JP | 2004-67424 | 3/2004 |
| JP | 2004-74971 | 3/2004 |
| WO | WO-96/27574 A1 | 9/1996 |
| WO | WO-98/04507 A1 | 2/1998 |
| WO | WO-03/011798 A1 | 2/2003 |

OTHER PUBLICATIONS

Office Action issued on Feb. 2, 2010, in corresponding Japanese Patent Application No. 2004-278830.

* cited by examiner

*Primary Examiner*—Jerry Lorengo
*Assistant Examiner*—James E McDonough
(74) *Attorney, Agent, or Firm*—Birch, Stewart, Kolasch & Birch, LLP

(57) ABSTRACT

A highly heat-resistant gas generating agent is provided. The gas generating agent is for a gas generator for an airbag system that is installed at least outside a vehicle cabin and that protects an individual subjected to impact by the vehicle, and has a mass loss rate of not more than 1% after holding for 400 hours at 130° C. in a sealed system. The gas generating agent preferably comprises fuel and oxidizing agent and the melting point of the fuel is preferably at least 250° C.

12 Claims, No Drawings

GAS GENERATING AGENT

CROSS-REFERENCE TO RELATED APPLICATIONS

This Nonprovisional application claims priority under 35 U.S.C. §119(e) on U.S. Provisional Application No. 60/614,051 filed on Sep. 30, 2004 and under 35 U.S.C. §119(a) on Patent Application No. 2004-278830 filed in Japan on Sep. 27, 2004, the entire contents of which are hereby incorporated by reference.

TECHNICAL FIELD

The invention relates to a gas generating agent for a gas generator that is used in an airbag system for the protection of an individual subjected to impact by a vehicle.

BACKGROUND ART

In addition to airbag systems for protecting the passengers of an automobile, the development has also recently been desired of airbag systems for the protection of individuals (pedestrians and the like) subjected to impact by an automobile.

Since the gas generator in a pedestrian-protective airbag system is installed outside the cabin (the interior of the automobile in which the passengers reside), it is readily subject to influences from the outside environment and to influences such as heat from the automobile engine or the like, making the implementation of countermeasures to these influences a necessity.

The claims in WO-A No. 96/27574 describe a gas generating composition comprising the combination of nitroguanidine and phase-stabilized ammonium nitrate; this gas generating composition is thermally stable and has a melting point of not less than 100° C. In addition, in the examples, the ammonium nitrate exhibits phase transitions at 120° C. and 130° C., and volumetric changes therefore occur when left at these high temperatures that make it impossible for the gas generating composition to retain its shape.

The claims in WO-A No. 98/04507 describe a thermally stable non-azide gas generating agent comprising a combination of nitroguanidine, tetrazoles, and triazoles as fuel with phase-stabilized ammonium nitrate or ammonium perchlorate as oxidizing agent. When phase-stabilized ammonium nitrate is added, however, the ammonium nitrate undergoes phase transitions at 120° C. and 130° C., and significant volumetric changes therefore occur when left at these high temperatures that make it impossible for the gas generating composition to retain its shape. In addition, tetrazoles and triazoles react even at 100° C. with phase-stabilized ammonium nitrate and decompose, generating ammonia gas. Ammonium perchlorate is unsuitable for use in airbag systems because it produces large amounts of gases such as hydrogen chloride and chlorine during combustion.

The claims of WO-A No. 03/011798 describe a highly thermally stable and strongly cohesive gas generating agent that comprises cationic polymer and anionic polymer and also binder. However, at the level of specifics, the operating temperature range for the gas generating agent is limited to −40° C. to 120° C., and only a 107° C.×400 hr high-temperature storage test and a heat shock test at the level of −40° C. to 100° C.×200 cycles are conducted in the examples.

The heat resistance of the gas generating agents according to the inventions in the aforementioned WO-A No. 96/27574, WO-A No. 98/04507, and WO-A No. 03/011798 is inadequate when the gas generator is installed in a location readily susceptible to automobile-induced thermal effects, for example, around the engine compartment.

DISCLOSURE OF THE INVENTION

The invention provides a gas generating agent for the gas generator in an airbag system for the protection of an individual subjected to impact by a vehicle, the gas generating agent in particular exhibiting an excellent heat resistance.

The invention provides a gas generating agent for a gas generator for an airbag system that is installed at least outside the vehicle cabin and that protects an individual subjected to impact by the vehicle, the gas generating agent having a mass loss rate of not more than 1% after holding for 400 hours at 130° C. in a sealed system.

The invention provides the above shown gas generating agent, accommodated in a gas generator of an airbag system that is installed at least outside a vehicle cabin.

The invention provides use of the above shown gas generating agent for a gas generator of an airbag system that is installed at least outside a vehicle cabin.

The gas generating agent of the present invention comprises fuel and an oxidizing agent and the melting point or decomposition point of the fuel can be preferably not less than 250° C.

The oxidizing agent of the gas generating agent according to the present invention can be at least one selected from basic copper nitrate, sodium nitrate, potassium nitrate, strontium nitrate, sodium perchlorate, potassium perchlorate, and strontium perchlorate.

The gas generating agent of the present invention is suitable for use in a pyrotechnic inflator that uses only combustion gas as the means for inflating the airbag, but in addition it may also be employed when both combustion gas and compressed gas (gas in which argon, helium, nitrogen gas are filled at high pressure) are used as the airbag inflation means or only compressed gas is used (in this case the gas generating agent is used to break the rupture plate that is used to form a sealed system in order to maintain the interior of the inflator at high pressure).

Due to its very high heat resistance, the gas generating agent of the present invention resists thermal influences from the outside environment and can as a result maintain the original design gas generating performance for a period of at least 10 years, which corresponds to the vehicle life.

The gas generating agent of the present invention can therefore be used for the gas generators used in airbag systems for the protection of individuals (pedestrians and the like) subjected to impact by a vehicle.

EMBODIMENTS OF THE INVENTION

Mass Loss Rate

Gas generating agent according to the present invention has a mass loss rate of not more than 1%, preferably not more than 0.8%, and more preferably not more than 0.6%, in each case after holding for 400 hours at 130° C. in a sealed system. This mass loss rate refers to the mass loss rate determined by the test method described in the examples. The individual components of gas generating agents that have the specified mass loss rate are described hereinbelow.

Components of the Gas Generating Agent

The gas generating agent according to the invention comprises (a) fuel and (b) oxidizing agent and as necessary may contain (c) binder and/or (d) additive.

The fuel of Component (a) preferably has a melting point or decomposition point of at least 250° C. Such fuel can be exemplified by at least one selected from the components in Tables 1 to 5 and the hereinbelow-listed plastic materials and rubber materials.

In Table In Tables 1-5, the species of the fuel are accompanied with their melting point (mp).

TABLE 1

| # | Compound name | mp (° C.) |
|---|---|---|
| 1 | Aurin | 292 |
| 2 | Akuammine | 255 |
| 3 | Acridone | 354 |
| 4 | 8-azaguanine | >300 |
| 5 | m,p-acetamidobenzoic acid | 248–257 |
| 6 | Acenaphthoquinone | 260–261 |
| 7 | 2,2'-,3,3'-,4,4'-azoxybenzoic acid | 240–320 |
| 8 | Azodibenzoic acid | 330 |
| 9 | Adenine trihydrate | 360–365 |
| 10 | Adamantane | 268–270 |
| 11 | Afatoxin B1 | 268 |
| 12 | Amaric acid | 246 |
| 13 | 1-,2-aminoanthraquinone | 252–302 |
| 14 | 2-amino-2-methylbutyric acid | 317–318 |
| 15 | (±)-2-aminobutyric acid | 307 |
| 16 | L-2-aminobutyric acid | 270–280 |
| 17 | Alloxantin dihydrate | 253–255 |
| 18 | Alloxan | 256 |
| 19 | sodium benzoate monohydrate | 410–430 |
| 20 | Anthraquinone | 287 |
| 21 | 1-,2-anthraquinonecarboxylic acid | 292–293.5 |
| 22 | 1-,2-anthracenecarboxylic acid | 246–286 |
| 23 | 1,5-,2,6-anthracenediol | 265–295 |
| 24 | 2-anthrol | 255 |
| 25 | Isonicotinic acid | 317 |
| 26 | Isovanillic acid | 251 |
| 27 | Isophthalic acid | 349 |
| 28 | Indigo | 390–392 |
| 29 | Urazole | 249–250 |
| 30 | Uramil | 310–320 |

TABLE 2

| # | Compound name | mp (° C.) |
|---|---|---|
| 31 | Urusolic acid | 283–285 |
| 32 | Eosin | 295–296 |
| 33 | Equilenin | 254–256 |
| 34 | Estrone | 254–256 |
| 35 | Oxindigo | 276–278 |
| 36 | 4-oxo-4H-pyran-2-carboxylic acid | 250 |
| 37 | 4-oxo-4H-pyran-2,6-dicarboxylic acid | 262 |
| 38 | Kainic acid | 251 |
| 39 | Kainetin | 266–267 |
| 40 | Gamabufogenin | 260–269 |
| 41 | Camptothecin | 264–267 |
| 42 | m-tannic acid | 268 |
| 43 | Sodium formate | 253 |
| 44 | Gitogenin | 264–267 |
| 45 | 3-,4-,5-quinolinecarboxylic acid | 253–342 |
| 46 | p-quinquephenyl | 395 |
| 47 | p-quaterphenyl | 320 |
| 48 | Guanidinobutyric acid | 280–284 |
| 49 | Guanine | >360 |
| 50 | Glycyrrhetinic acid | 292–294 |
| 51 | Chrysene | 255–256 |
| 52 | Potassium acetate | 292 |
| 53 | Coronene | 442 |
| 54 | Anhydrous sodium acetate | 320–321 |
| 55 | Thalidomide | 269–273 |
| 56 | 4,4'-diaminobenzene | 250–251 |
| 57 | 1,2-diaminoanthraquinone | 303–304 |
| 58 | 1,4-diaminoanthraquinone | 268 |
| 59 | 1,5-diaminoanthraquinone | 319 |
| 60 | 1,8-diaminoanthraquinone | 262 |

TABLE 3

| # | Compound name | mp (° C.) |
|---|---|---|
| 61 | 1,8-diaminoanthraquinone | 310–320 |
| 62 | α-,β-cyclodextrin | 278,298–300 |
| 63 | trans-cyclohexanedicarboxylic acid | 312–313 |
| 64 | Cytosine | 320–325 |
| 65 | 1,5-dinitroanthraquinone | 384–385 |
| 66 | 1,8-dinitroanthraquinone | 311–312 |
| 67 | 2,7-dinitroanthraquinone | 290–291 |
| 68 | 1,2-dihydroxyanthraquinone | 292 |
| 69 | 1,3-dihydroxyanthraquinone | 262 |
| 70 | 1,5-dihydroxyanthraquinone | 280 |
| 71 | 1,6-dihydroxyanthraquinone | 270–273 |
| 72 | 1,7-dihydroxyanthraquinone | >293 |
| 73 | 2,3-dihydroxyanthraquinone | >260 |
| 74 | 2,6-dihydroxyanthraquinone | >365 |
| 75 | 2,7-dihydroxyanthraquinone | 350–355 |
| 76 | 6,7-dihydroxycoumarin | 272 |
| 77 | 7,8-dihydroxycoumarin | 261–263 |
| 78 | dibenz[a,h]anthracene | 266–267 |
| 79 | Calcium oxalate | 250 |
| 80 | potassium tartrate hemihydrate | 260 |
| 81 | Cinchonine | 265 |
| 82 | Succinamide | 268–270 |
| 83 | Potassium stearate | 353 |
| 84 | Sodium stearate | 288 |
| 85 | Solanine | 285 |
| 86 | Daidzein | 315–320 |
| 87 | Tetracyanobenzene | 270–272 |
| 88 | 1,2,5,6-tetrahydroxyanthraquinone | >300 |
| 89 | 1,2,5,8-tetrahydroxyanthraquinone | 313–316 |
| 90 | 1,3,5,7-tetrahydroxyanthraquinone | >360 |

TABLE 4

| # | Compound name | mp (° C.) |
|---|---|---|
| 91 | 3,3',4',7-tetrahydroxyflavone | 330 |
| 92 | 3,4',5,7-tetrahydroxyflavone | 276–278 |
| 93 | 3',4',5,7-tetrahydroxyflavone | 329–330 |
| 94 | Tetrahydroxy-p-benzoquinone | >320 |
| 95 | Tetraphenylmethane | 284–285 |
| 96 | Terephthalaldehyde acid | 256 |
| 97 | 1,2,3-trihydroxyanthracene | 313–314 |
| 98 | 1,2,4-trihydroxyanthracene | 263 |
| 99 | 1,2,5-trihydroxyanthracene | 278 |
| 100 | 1,2,6-trihydroxyanthracene | 360 |
| 101 | 1,2,7-trihydroxyanthracene | 369 |
| 102 | 4',5,7-trihydroxyflavone | 345–350 |
| 103 | 4,5,7-trihydroxy-2-methylanthraquinone | 259–260 |
| 104 | 2,4,5-triphenylimidazole | 275 |
| 105 | Triptycene | 251–253 |
| 106 | Uric acid | >400 |
| 107 | Sodium palmitate | 292–297 |
| 108 | Potassium palmitate | 375 |
| 109 | Harmine | 261 |
| 110 | Δ10,10'-bianthrone | >300 |
| 111 | Violanthrone | 490–495 |
| 112 | 3,3'-biquinolyl | 271 |
| 113 | Potassium picrate | 250.1 |
| 114 | Picene | 367–369 |
| 115 | 2-,4-,5-hydroxyisophthalic acid | 250–310 |
| 116 | 2-hydroxyterephthalic acid | 320–325 |
| 117 | 7-hydroxy-1-naphthoic acid | 257 |
| 118 | 4,4'-bi-1-naphthol | 300 |
| 119 | 3,3'-biphenyldicarboxylic acid | 357–358 |
| 120 | 2,5-piperazinecarboxylic acid | 262 |

TABLE 5

| # | Compound name | mp (° C.) |
|---|---|---|
| 121 | 2,4-pyridinedicarboxylic acid | 248–250 |
| 122 | 2,5-pyridinedicarboxylic acid | 254 |

TABLE 5-continued

| # | Compound name | mp (° C.) |
|---|---|---|
| 123 | 3,4-pyrindinedicarboxylic acid | 266–268 |
| 124 | 3,5-pyrindinedicarboxylic acid | 323 |
| 125 | 3,4,5-pyrindinetricarboxylic acid | 261 |
| 126 | Fumaric acid | 300–302 |
| 127 | Friedelin | 267–269 |
| 128 | Betaine | 293–294 |
| 129 | Betulin | 259 |
| 130 | Hematein | 250 |
| 131 | Perylene | 279 |
| 132 | Heroin (diacetylmorphine) | 272–274 |
| 133 | 2,2'-,3,3'-benzidinecarboxylic acid | 265–275 |
| 134 | 1,2,3,5-benzenetetracarboxylic acid | 252 |
| 135 | 1,2,4,5-benzenetetracarboxylic acid | 279 |
| 136 | 1,2,4,5-benzenetetracarboxylic dianhydride | 289 |
| 137 | Benzenehexacarboxylic acid | 285–287 |
| 138 | Benzenehexacarboxylic trianhydride | 320 |
| 139 | Benzimidazolone | 310 |
| 140 | 4,4'-benzophenonedicarboxylic acid | 360–365 |
| 141 | Pentacene | 270–271 |
| 142 | 2',3,4',5,7-pentahydroxyflavone | 290 |
| 143 | 2',3,4,4',6-pentahydroxyflavone | 314 |
| 144 | gallic acid monohydrate | 258–265 |
| 145 | 5-methylisophthalic acid | 292–293 |
| 146 | 7-methyluric acid | ~370–decomp. |
| 147 | 6-methoxy-4-quinolinecarboxylic acid | 280 |
| 148 | Melamine | <250 |
| 149 | Lycorine | 275–280 |
| 150 | Rubicene | 306 |
| 151 | Luminol | 332–333 |
| 152 | Reserpine | 264–265 |
| 153 | Rosolic acid | >270 |

Plastic Materials

Phenol-formaldehyde resins, urea-formaldehyde resins, melamine-formaldehyde resins, unsaturated polyesters, polydiallyl phthalates, epoxy resins, polyurethanes, polyimides, polyethylenes, polypropylenes, polystyrenes, acrylonitrile/butadiene/styrene copolymers, polyamides, polymethyl methacrylates, polyoxymethylenes, polycarbonates, polyethylene terephthalates, silicon resins, diallyl phthalate resins, dicyclopentadiene resins, polyphenylene ethers, liquid-crystal polymers, polyarylates, polyetherketones, polyamideimides, polyetherimides or the like.

Rubber Materials

Natural rubber, isoprene rubbers, butadiene rubbers, butyl rubbers, styrene-butadiene rubbers, nitrile rubbers, urethane rubbers, ethylene-propylene rubbers, acrylic rubbers, silicone rubbers or the like.

The oxidizing agent of Component (b) can be exemplified by at least one selected from basic copper nitrate, sodium nitrate, potassium nitrate, strontium nitrate, sodium perchlorate, potassium perchlorate, and strontium perchlorate. Potassium perchlorate, basic copper nitrate, sodium nitrate, and potassium nitrate are preferred among the preceding from the standpoint of attaining the object of the invention.

The gas generating agent according to the present invention can as necessary employ a binder as the component (c) within a range in which the object of the invention can be attained.

Usable as the binder is at least one selected from carboxymethyl cellulose (CMC), sodium carboxymethyl cellulose (CMCNa), potassium carboxymethyl cellulose, ammonium carboxymethyl cellulose, cellulose acetate, cellulose acetate butyrate, methyl cellulose, ethyl cellulose, hydroxyethyl cellulose, ethyl hydroxyethyl cellulose, hydroxypropyl cellulose, carboxymethyl ethyl cellulose, microcrystalline cellulose, polyacrylamide, aminated polyacrylamide, polyacrylhydrazide, acrylamide-metal acrylate copolymer, polyacrylamide-polyacrylic ester copolymer, polyvinyl alcohol, acrylic rubber, guar gum, starch, silicone, or the like.

The gas generating agent according to the present invention can as necessary employ various additives as the component (d) within a range in which the object of the invention can be attained.

These additives can be exemplified by at least one selected from metal oxides such as copper oxide, iron oxide, zinc oxide, cobalt oxide, manganese oxide, molybdenum oxide, nickel oxide, bismuth oxide, gallium oxide, silica, alumina, or the like; metal carbonates or basic metal carbonates such as cobalt carbonate, calcium carbonate, magnesium carbonate, basic zinc carbonate, basic copper carbonate, or the like; metal oxide or hydroxide composite compounds such as Japanese acid clay, kaolin, talc, bentonite, diatomaceous earth, hydrotalcite, or the like; metal acid salts such as sodium silicate, mica molybdate, cobalt molybdate, ammonium molybdate, or the like; molybdenum disulfide, calcium stearate, silicon nitride, and silicon carbide.

Content Ratios in the Gas Generating Agent

In the case where the gas generating agent of the present invention contains two components, (a) fuel and (b) oxidizing agent, the following content ratios are preferred with regard to attaining the object of the invention:

Content ratio of (a) fuel is preferably 5 to 65 mass %, more preferably 8 to 60 mass %, and even more preferably 10 to 50 mass %; and Content ratio of (b) oxidizing agent is preferably 35 to 95 mass %, more preferably 40 to 92 mass %, and even more preferably 50 to 90 mass %.

In the case where the gas generating agent of the present invention contains three components, (a) fuel, (b) oxidizing agent, and (c) binder, the following content ratios are preferred with regard to attaining the object of the invention:

Content ratio of (a) fuel is preferably 5 to 60 mass %, more preferably 8 to 55 mass %, and even more preferably 10 to 50 mass %;

Content ratio of (b) is preferably 35 to 95 mass %, more preferably 40 to 92 mass %, and even more preferably 50 to 90 mass % oxidizing agent (b); and Content ratio of (c) binder is preferably 0.1 to 15 mass %, more preferably 1 to 12 mass %, and even more preferably 2 to 10 mass %.

In the case where the gas generating agent of the present invention contains four components, (a) fuel, (b) oxidizing agent, (c) binder, and (d) additive, the following content ratios are preferred with regard to attaining the object of the invention:

Content ratio of (a) fuel is preferably 5 to 60 mass %, more preferably 8 to 55 mass %, and even more preferably 10 to 50 mass %;

Content ratio of (b) oxidizing agent is preferably 35 to 95 mass %, more preferably 40 to 92 mass %, and even more preferably 50 to 90 mass %;

Content ratio of (c) binder is preferably 0.1 to 15 mass %, more preferably 1 to 12 mass %, and even more preferably 2 to 10 mass %; and Content ratio of (d) additive is preferably 0.1 to 10 mass %, more preferably 0.5 to 7 mass %, and even more preferably 1 to 5 mass %.

The gas generating agent according to the invention can be molded into a desired shape and can be formed into a molded article of a shape such as a single-perforated cylinder, a porous cylinder or a pellet. These molded articles can be produced by mixing water or organic solvent with the gas generating agent followed by extrusion molding (in case of molded articles in the shape of a single-perforated cylinder and a porous cylinder) or by compression molding using a pelletizer or the like (in case of a molded article in the shape of a pellet).

The gas generating agent of the present invention (or a molded article obtained therefrom) is used as a gas generating agent for a gas generator used in an airbag system for the protection of individuals subjected to impact by a vehicle, but can also be employed with publicly known inflators for airbags for a driver side, a passenger side, side airbags, inflatable curtains, knee bolsters, inflatable seat belts, and tubular systems and gas generators for pretensioners.

In addition, the gas generating agent of the present invention or a molded article obtained therefrom can also be used as an igniting agent, known as an enhancer (or booster), for transferring the energy of a detonator or squib to a gas generating agent.

EXAMPLES

Mass Loss Rate

Immediately after introducing 40.0±0.1 g of precisely weighed gas generating agent (powder form) into a container (internal volume of 118 mL) provided with an SUS rupture plate (0.2 mm aluminum plate, rupture pressure is approximately 12 kg/cm$^2$), the container was sealed. The interior of the container was isolated from the outside atmosphere. The container was placed in a thermostat at 130° C. and was removed after standing for 400 hours. The gas generating agent was then precisely weighed and the mass loss rate was calculated using the following formula.

mass loss rate (%)=(initial mass−post-test mass)×100/initial mass (Initial mass and post-test mass refer to the mass of the gas generating agent)

Burning Rate

A gas generating composition was prepared and molded into a strand with a diameter of approximately 9.6 mm and a height of approximately 12.7 mm. The burning rate was measured under a nitrogen atmosphere at a pressure of 6860 kPa.

Example 1

A gas generating agent with the composition comprising melamine-formaldehyde resin/potassium perchlorate/sodium carboxymethyl cellulose (CMCNa): 24.1/70.9/5 (mass %) was prepared. The mass loss rate and burning rate were measured on this gas generating agent. The result was a mass loss rate of 0.3%, which was indicative of an excellent heat resistance. The burning rate was 14 mm/s, which was indicative of a practically useful burning performance.

Example 2

A molded article of gas generating agent with the composition comprising polyamide-6/potassium perchlorate: 16.4/83.6 (mass %) were prepared. The mass loss rate and burning rate were measured using the molded article of gas generating agent. The result was a mass loss rate of 0.4%, which was indicative of an excellent heat resistance. The burning rate was 7.5 mm/s, which was indicative of a practically useful burning performance.

Example 3

A molded article of gas generating agent with the composition comprising vinyl methyl silicone rubber/potassium perchlorate: 21.2/78.8 (mass %) were prepared. The mass loss rate and burning rate were measured using the molded article of gas generating agent. The result was a mass loss rate of 0.6%, which was indicative of an excellent heat resistance. The burning rate was 18 mm/s, which was indicative of a practically useful burning performance.

The invention claimed is:

1. A gas generating agent, for a gas generator for an airbag system that is installed at least outside a vehicle cabin and that protects an individual subjected to impact by the vehicle, the gas generating agent having a mass loss rate of not more than 1% after holding for 400 hours at 130° C. in a sealed system, said gas generating agent comprising:
    at least one fuel having a melting point or decomposition point of at least 250° C., said fuel is 2-amino-2-methylbutyric acid, a phenol-formaldehyde resin or natural rubber;
    basic copper nitrate as an oxidizing agent; and
    at least one binder selected from the group consisting of carboxymethyl cellulose (CMC), sodium carboxymethyl cellulose (CMCNa), potassium carboxymethyl cellulose, ammonium carboxymethyl cellulose, cellulose acetate, cellulose acetate butyrate, methyl cellulose, ethyl cellulose, hydroxyethyl cellulose, ethyl hydroxyethyl cellulose, hydroxypropyl cellulose, carboxymethyl ethyl cellulose, microcrystalline cellulose, polyacrylamide, aminated polyacrylamide, polyacrylhydrazide, acrylamide-metal acrylate copolymer, polyacrylamide-polyacrylic ester copolymer, polyvinyl alcohol, acrylic rubber, guar gum, starch and silicone.

2. The gas generating agent according to claim 1, wherein the binder is sodium carboxymethyl cellulose (CMC); and
    said gas generating agent further comprises at least one additive selected from the group consisting of copper oxide, basic copper carbonate, Japanese acid clay, sodium silicate, and calcium stearate.

3. The gas generating agent according to claim 2, wherein the fuel is 2-amino-2-methylbutyric acid.

4. The gas generating agent according to claim 3, wherein the additive is Japanese acid clay.

5. The gas generating agent according to claim 2, wherein the fuel is natural rubber.

6. The gas generating agent according to claim 5, wherein the additive is Japanese acid clay.

7. A gas generating agent for a gas generator for an airbag system that is installed at least outside a vehicle cabin and that protects an individual subjected to impact by the vehicle, the gas generating agent having a mass loss rate of not more than 1% after holding for 400 hours at 130° C. in a sealed system, said gas generating agent comprising:
    5 to 65 mass % of at least one fuel having a melting point or decomposition point of at least 250° C., said fuel is 2-amino-2-methylbutyric acid, a phenol-formaldehyde resin or natural rubber;
    35 to 95 mass % of basic copper nitrate as an oxidizing agent; and
    a binder.

8. The gas generating agent according to claim 7, wherein the binder is sodium carboxymethyl cellulose (CMC); and
   said gas generating agent further comprises at least one additive selected from the group consisting of copper oxide, basic copper carbonate, Japanese acid clay, sodium silicate, and calcium stearate.

9. The gas generating agent according to claim 8, wherein the fuel is 2-amino-2-methylbutyric acid.

10. The gas generating agent according to claim 9, wherein the additive is Japanese acid clay.

11. The gas generating agent according to claim 8, wherein the fuel is natural rubber.

12. The gas generating agent according to claim 11, wherein the additive is Japanese acid clay.

* * * * *